G. A. KEENE.
Liquid Measure.
No. 35,613.
Patented June 17, 1862.
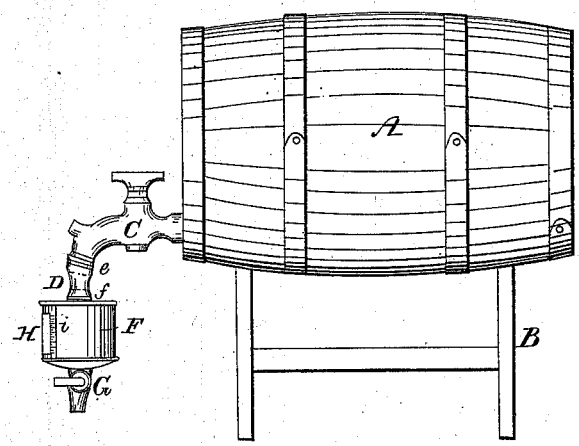
Witnesses.
William M Kimball
Cutting Pettingell
Inventor.
Geo. A. Keene.

UNITED STATES PATENT OFFICE.

GEORGE A. KEENE, OF NEWBURYPORT, MASSACHUSETTS.

IMPROVEMENT IN PENDENT MEASURING-FUNNELS.

Specification forming part of Letters Patent No. 35,613, dated June 17, 1862.

*To all whom it may concern:*

Be it known that I, GEORGE A. KEENE, of Newburyport, in the county of Essex and Commonwealth of Massachusetts, have invented a new and useful Pendent Tunnel-Measure; and I do hereby declare that the following is a full, clear, and exact description of the construction and operation of the same, reference being had to the accompanying drawing, forming a part of this specification.

The nature of my improvement consists in attaching a pendent tunnel-measure to a cask-faucet by means of a rubber or other flexible pipe, so that in whatever direction the cask may be tipped the flat top of said measure will preserve its level, so as to measure correctly by the graduated glass on the side, while at the same time all dust and insects are effectually excluded.

The figure is a side view of the tunnel-measure attached to the faucet of a cask.

To enable others skilled in the art to make and use my improvement, I will now proceed to describe its construction and operation.

A is a cask of any kind, and B is the horse or frame in general use for supporting the same.

C is a faucet, of the ordinary construction, inserted in the head of a cask, A.

F is a covered measure, of tin or other suitable material, in the center of whose bottom, as represented in the drawing, is a faucet, G, the end of which is straight and of such a size as to enter the nose of a common bottle or jug. In the top of the measure is a small vent.

H is a piece of glass inserted in the side of the measure, water-tight, in the usual manner, through which glass the liquid in the measure can be seen; and *i* are the graduations, indicating pints, quarts, &c.

Attached to and projecting up from the center of the top of F, as shown by the dotted lines, is a short tube.

D is a rubber or other flexible pipe, into the upper end of which the lower end of the faucet C is inserted and confined by means of a string or wire, *e*, or in any other suitable and obvious manner. Into the lower end of this pipe D is inserted the pipe projecting from the top of F and confined by means of the string or wire *f*, or in any other suitable manner. Thus, as this pipe D is flexible, it follows that the top of the measure F will always be level, so as to measure correctly, whether the cask be horizontal or tipped in any direction, and whether the faucet be inserted with accuracy or not, while at the same time all dust and insects will be effectually excluded.

Answering thus the double purpose of a measure and tunnel, excluding dust and insects, and being, moreover, self-adjusting, so as to measure correctly, whatever way the cask or its faucet may be inclined, the utility and convenience of my improvement must be obvious to all.

Having thus described the construction and operation of my invention, what I claim as new, and desire to secure by Letters Patent, is—

Attaching a pendent tunnel-measure to a cask-faucet by means of a rubber or other flexible tube, D, substantially as described and for the objects specified.

GEO. A. KEENE.

Witnesses:
WILLIAM M. KIMBALL,
PUTTING PETTINGELL, Jr.